United States Patent [19]

Brown

[11] 4,191,336

[45] Mar. 4, 1980

[54] PROCESS FOR RECOVERING MAGNETITE FROM FLY ASH

[76] Inventor: Jim W. Brown, 211 Country Club La., Carterville, Ill. 62918

[21] Appl. No.: 967,969

[22] Filed: Dec. 11, 1978

[51] Int. Cl.² ............................................. B02C 23/14
[52] U.S. Cl. ...................................... 241/21; 241/24; 241/77; 209/214; 209/39
[58] Field of Search .............................. 241/77, 21, 24; 209/214, 39, 2, 3, 4, 10, 216, 8; 106/DIG. 1, 288 B

[56] References Cited

U.S. PATENT DOCUMENTS

| 1,512,870 | 10/1924 | Ullrich et al. | 241/77 X |
| 3,769,054 | 10/1973 | Pennachetti et al. | 106/288 B |

Primary Examiner—Ralph J. Hill

[57] ABSTRACT

This invention relates to a process for recovering magnetite from fly ash. Fly ash containing magnetite is made into a slurry having 5% to 10% solids by weight and the slurry is then concentrated in a settling tank to a slurry having approximately 20% solids by weight. The concentrated slurry is delivered to a magnetic separator where the magnetite is separated from the remainder of the fly ash. The magnetite is then crushed in a pulverizer to a size so that 95% of the crushed magnetite will pass through a 325 mesh sieve. The crushed magnetite is then delivered to a second magnetite separator which is weaker than the first magnetic separator to separate the crushed magnetite from any impurities. The purified crushed magnetite is then dried and stored.

11 Claims, 1 Drawing Figure

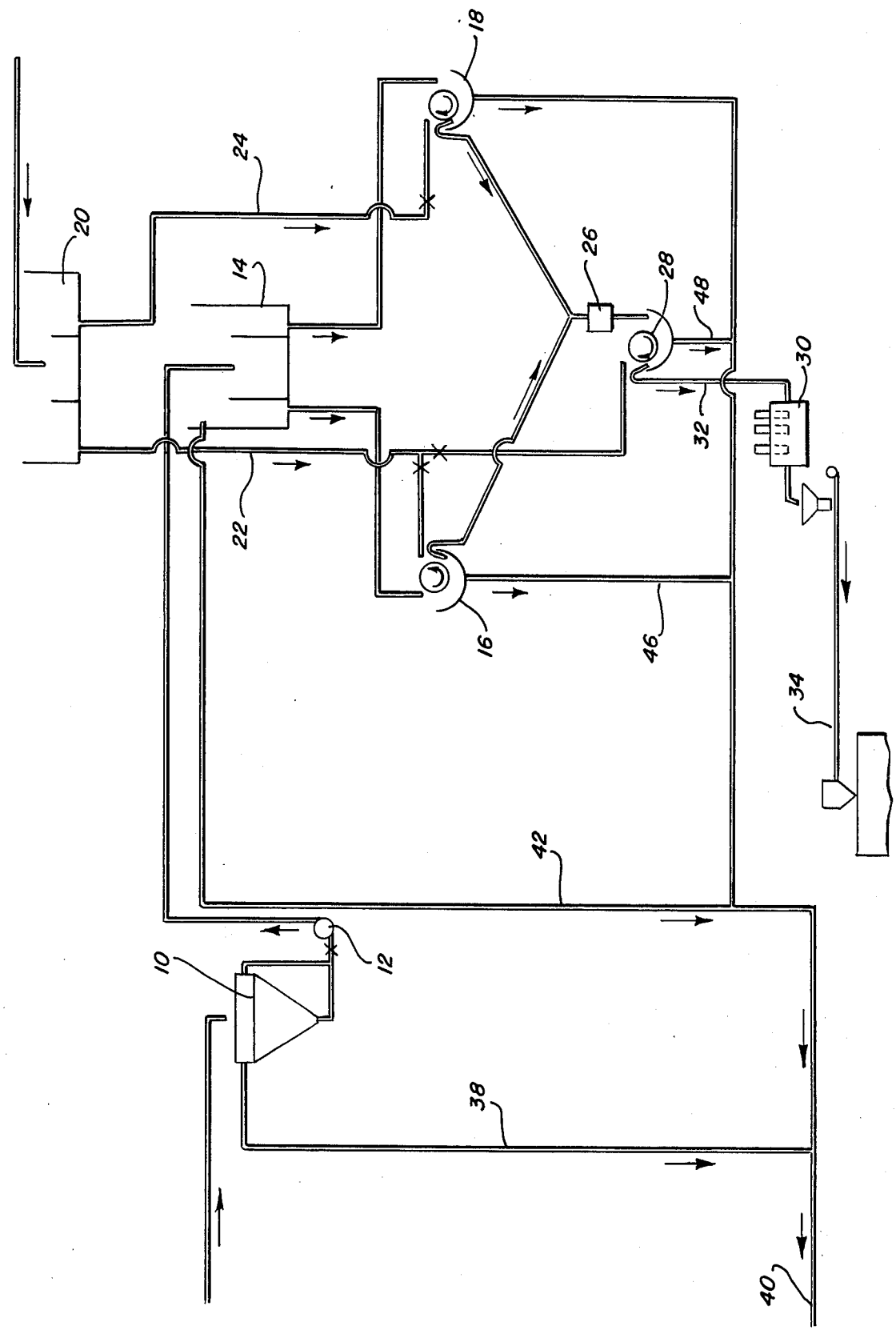

PROCESS FOR RECOVERING MAGNETITE FROM FLY ASH

BACKGROUND OF THE INVENTION

Recovery of materials from fly ash is well known. A typical disclosure showing recovery of magnetic materials from fly ash is contained in U.S. Pat. No. 3,769,054. One of the problems with the heretofore known processes for recovery of magnetite from fly ash is that the processes are expensive, and the recovered magnetite often times contains undesirable impurities. It is desirable to have an inexpensive process which produces magnetite having a high degree of purity.

SUMMARY OF THE INVENTION

The present invention provides an improved process for the recovery of magnetite from fly ash. A fly ash and water slurry is delivered from a coal burning power plant to a primary settling tank. The slurry is allowed to settle so that the concentration of solids in the slurry is approximately 20% by weight. The concentrated slurry is then delivered to a slurry head tank. The concentrated slurry flows from the slurry head tank to each of two identical magnetic separators which are arranged in parallel flow paths. The magnetite is separated from the remainder of the fly ash at each of the magnetic separators. The separated magnetite is delivered to a pulverizer. The magnetite is crushed in the pulverizer to a size whereby 95% of the magnetite will pass through a 325 mesh sieve. The crushed magnetite is then delivered to a third magnetic separator, which magnetic separator has one half the magnetic strength of either of the two aforementioned magnetic separators. The magnetite is then separated from impurities which are released from the magnetite in crushing. The purified crushed magnetite is delivered to a vacuum filter where the magnetite is dried, and then delivered to a storage bin.

BRIEF DESCRIPTION OF THE DRAWING

The drawing is a schematic flow diagram of a fly ash treatment process in which magnetite is removed from fly ash and purified, and wherein the remainder of the fly ash is discharged to a settling pond.

DESCRIPTION OF THE PREFERRED EMBODIMENT

The process depicted in the drawing is one for the recovery of magnetite from fly ash, which fly ash is collected from a coal burning furnace. Magnetite is separated from the remainder of the fly ash, crushed, purified, dried and placed into storage.

In the process shown in the drawing, a slurry of fly ash in water having a concentration of solids between 5% to 10% by weight is delivered from a fly ash collector (not shown herein) to a five thousand gallon primary settling tank 10. The slurry is allowed to settle until the concentration of the slurry reached is approximately 20% solids by weight. The concentrated slurry of fly ash and water is pumped by pump 12 to a one thousand gallon slurry head tank 14. The concentrated slurry flows from slurry head tank 14 to two wet drum one thousand gauss magnetic separators 16 and 18. Magnetic separators 16 and 18 are connected to slurry head tank in parallel to each other, thereby each receiving a substantially equal volume of flow of concentrated slurry. Water from a fresh water head tank 20 is delivered to the magnetic separators 16 and 18 through piping 22 and 24, respectively.

The magnetite in the fly ash is separated from the remainder of the products in the fly ash by the two magnetic separators 16 and 18. The magnetite, which is separated from the remainder of the fly ash, is in the form of hollow spheres having a size which is approximately 200 mesh. Due to the high temperature of combustion, the magnetite is formed into the spherical forms and some impurities are usually attached to the spherical particles of magnetite. These impurities are primarily silica. The hollow spherical configuration of the magnetite particles causes the magnetite to have a low specific gravity which is substantially less than the desired specific gravity of 5.0.

The separated magnetite is mixed with fresh water for fresh water head tank 20 and transferred from magnetic separators 16 and 18 to pulverizer 26, which is a vibratory grinding mill. The magnetite spheres are crushed in pulverizer 26 releasing substantially all of the impurities from the magnetite. The crushing of the magnetite results in a crushed magnetite having a size whereby 95% of the crushed magnetite will pass through a 325 mesh sieve.

The crushed magnetite is then transferred to a single wet drum 500 gauss magnetic separator 28. Magnetic separator 28 is also connected to a fresh water head tank 20 to provide water for carrying away the purified magnetite from separator 28. The crushed magnetite with the impurities enters the magnetic separator 28, which has a magnetic force one half of the magnetic force of each of the magnetic separators 16 and 18. The lesser magnetic force attracts magnetite which has substantially no impurities attached to it, so that the magnetic separator 28 effectively separates the crushed magnetite from the impurities, which were attached to the magnetite spheres. By virtue of the fact that separator 28 has a lesser magnetic force than separator 16 and 18, any magnetite particles which have a substantial amount of impurities attached, are not attached to the separator drum, but are discharged with the impurities, thereby the magnetite leaving separator 28 has a high degree of purity.

The purified crushed magnetite is then transferred to vacuum filter 30 through pipe 32. Vacuum filter 30 removes the water from the magnetite. The dried magnetite is pneumatically conveyed along pipe 34 to a storage bin 36 where the magnetite is accumulated prior to transport from the storage bin. The magnetite received in the storage bin has a high degree of purity by virtue of the double magnetic separating of the magnetite first from the fly ash and then from impurities which were attached to magnetite spheres.

The excess water and the remainder of the fly ash material are delivered to a settling pond (not shown herein) for disposition, as is conventional and well known in the art. An overflow pipe 38 delivers overflow from the primary settling tank 10 to a discharge pipe 40 which empties into the settling pond. The slurry head tank 14 is also connected to the discharge pipe 40 by a pipe 42 to carry away overflow water from tank 14. Magnetic separator 18 is connected to the pipe 42 by a pipe 44 to carry the remains of the fly ash and water from magnetic separator 18 to discharge pipe 40. In a like manner, magnetic separator 16 is connected to pipe 44 by a pipe 46 for carrying the remainder of the fly ash and water to the discharge pipe 40. The magnetic separator 28 is also connected to pipe 44 by a pipe 48 to carry magnetite impurities and water into pipe 44 for discharge to the settling pond.

Although a specific embodiment of the herein disclosed invention has been described in detail herein, it is to be understood that those skilled in the art may make instead various modifications, alterations and changes in the instant disclosure without departing from the spirit and scope of the present invention. It is to be expressly understood that the instant invention is limited only by the appended claims which measure the scope of this invention.

What is claimed is:

1. A process for recovering magnetite from fly ash comprising the steps of; making a slurry of fly ash and a liquid, delivering of the slurry to a magnetic separator, separating magnetite from the remainder of the fly ash with the magnetic separator, crushing the magnetite, separating the crushed magnetite from other materials with a second magnetic separator having a weaker magnetic field then the first mentioned magnetic separator, and drying the crushed magnetite.

2. A process for recovering magnetite from fly ash as defined in claim 1, wherein the liquid is water.

3. A process for recovering magnetite from fly ash as defined in claim 1, wherein the slurry of fly ash in a liquid is approximately 20% solids by weight.

4. A process for recovering magnetite from fly ash as defined in claim 1, wherein 95% of the crushed magnetite will pass through a 325 mesh sieve.

5. A process for recovering magnetite from fly ash as defined in claim 1, wherein the crushed magnetite has a size whereby 95% of the crushed magnetite will pass through a 325 mesh sieve, and said second magnetic separator has one half the magnetic strength of the first mentioned magnetic separator.

6. A process for recovering magnetite from fly ash as defined in claim 1, wherein the second magnetic separator has one half the magnetic strength of the first mentioned magnetic separator.

7. A process for recovering magnetite from fly ash as defined in claim 1, wherein the slurry is approximately 20% solids by weight, and 95% of the crushed magnetite will pass through a 325 mesh sieve.

8. A process for recovering magnetite from fly ash as defined in claim 1, wherein the liquid is water, said slurry is approximately 20% solids by weight, said crushed magnetite has a size whereby 95% of the magnetite will pass through a 325 mesh sieve, and the second magnetite separator has one half the magnetic strength of the first mentioned magnetic separator.

9. A process for recovering magnetite from fly ash as defined in claim 1, wherein the liquid is water, the slurry is approximately 20% solids by weight, and 95% of the crushed magnetite will pass through a 325 mesh sieve.

10. A process for recovering magnetite from fly ash as defined in claim 1, wherein the slurry is approximately 20% solids by weight, the crushed magnetite is of a size whereby 95% of the crushed magnetite will pass through a 325 mesh sieve, and the second magnetic separator has one half the magnetic strength of the first mentioned magnetic separator.

11. A process for recovering magnetite from fly ash comprising the steps of; making a slurry of fly ash and water having solids between 5% and 10% by weight, delivering the slurry to a settling tank, settling the slurry to a concentration having solids of approximately 20% by weight, delivering the concentrated slurry to a slurry head tank, delivering concentrated slurry from the slurry head tank to each of a pair of identical magnetic separators connected in parallel, separating magnetite from the remainder of the fly ash at each of the magnetic separators, delivering the magnetite from each of the magnetite separators to a single pulverizer, crushing the magnetite in the pulverizer to a size whereby 95% of the crushed magnetite will pass through a 325 mesh sieve, delivering the crushed magnetite to a third magnetic separator which has a weaker magnetic field than either of the two first mentioned magnetic separators, removing the crushed magnetite from any impurities at the third magnetic separator, and drying the crushed magnetite.

* * * * *